May 12, 1942. S. J. NORDSTROM 2,282,493
LUBRICATED VALVE
Filed Nov. 15, 1938
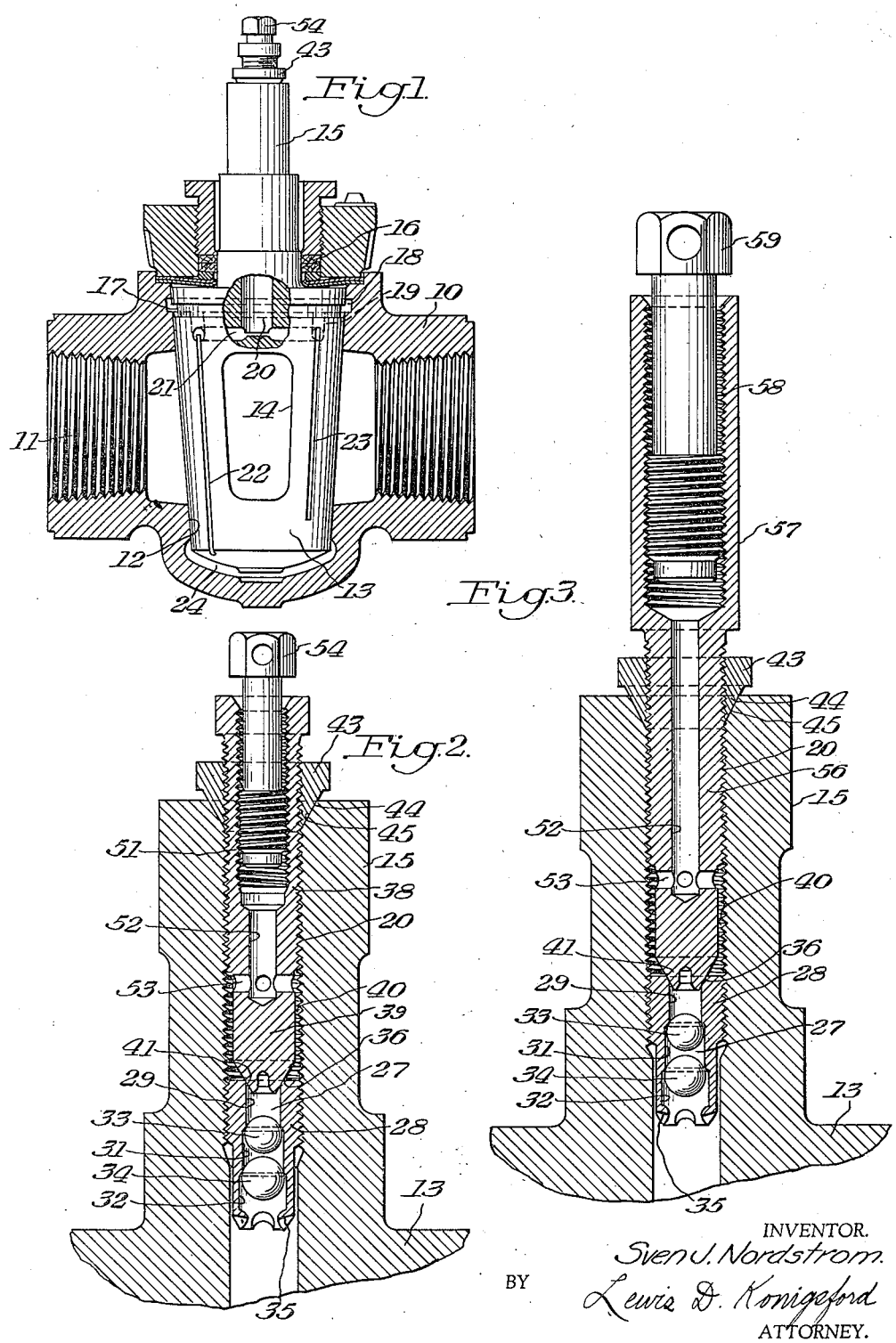
INVENTOR.
Sven J. Nordstrom.
BY Lewis D. Konigsford
ATTORNEY.

Patented May 12, 1942

2,282,493

UNITED STATES PATENT OFFICE 2,282,493

LUBRICATED VALVE

Sven J. Nordstrom, Lafayette, Calif., assignor to Merco Nordstrom Valve Company, Pittsburgh, Pa., a corporation of Delaware Application November 15, 1938, Serial No. 240,535

5 Claims. (Cl. 184—105)

The present invention relates to lubricated valves and more particularly to an improved lubrication construction for plug valves designed to positively prevent the escape of lubricant or line fluid therefrom.

In lubricated plug valves as heretofore constructed, it is the usual practice to provide a check valve in the form of a ball or other suitable construction between the lubricant reservoir and the lubricant groove system of the valve to prevent escape of line fluid or lubricant therefrom. At normal temperatures, should the check valve fail to properly seat, the viscosity of the lubricant sometimes assists in preventing escape of line fluid. Usually the escape of line fluid from the valve is accompanied by a fire or explosion hazard or danger of injury to the workmen in the vicinity of the valve. Where the valve is employed for carrying line fluid at relatively high temperatures, the viscosity of the lubricant is reduced by the heat and the lubricant, therefore, is less effective in preventing leakage due to imperfect seating of the ball check valve.

It is an object of the present invention to provide a lubricating system for a valve wherein the escape of lubricant and line fluid from the system is positively prevented.

It is a further object of the invention to provide a lubricating system for a valve having a check valve therein and a manually closeable valve to prevent the escape of lubricant and line fluid from the system.

It is a further object of the invention to provide a lubricating system for a valve having a lubricant reservoir carrying a supply of lubricant and wherein this reservoir is substantially exterior of the valve so as to prevent substantial heating of the lubricant in the reservoir.

According to the present invention, I provide a valve having a bore for supplying lubricant thereto with a positive seating valve located in the bore to prevent the escape of line fluid. In the preferred modification, this valve is threaded in the bore so that it can be moved longitudinally to and from its seat, and the lubricant reservoir is located within the valve member. A lubricant compressor of any suitable type may be secured to the valve member to compress the lubricant in the reservoir and force it to the valve lubricating system. The seat for the lubricator valve may be provided by the valve casing itself or by an insert located in the bore.

The invention will be described in connection with the accompanying drawing wherein I have illustrated a preferred embodiment of my invention by way of example and wherein:

Figure 1 shows my invention applied to a lubricated tapered plug valve,

Figure 2 is an enlarged view in vertical section illustrating my invention, and

Figure 3 is an enlarged vertical section view of a modification.

Referring to the drawing, there is shown a plug valve comprising a casing 10 having a transverse passageway 11 therein for flow of fluid, and a valve seat or bore 12 extending transversely thereto which preferably is of conical form. A plug 13, which preferably also is conical, is rotatably positioned within the valve seat 12, and has a port 14 adapted to register with the passageway 11 in open position of the valve. A stem 15, operably connected to the large end of plug 13, is provided for turning the plug. Any suitable arrangement of sealing means 16 may be provided for sealing the stem of the valve, the arrangement shown in my Patent No. 1,781,821, issued November 18, 1930, preferably being employed in the modification shown in Figure 1.

Any suitable lubricating groove system for the seating surfaces of the valve may be employed, the preferred system as shown in Figure 1 comprising opposed circumferential grooves 17 and 18 in the plug surface and casing seat respectively, having four short longitudinal extensions or dwarf grooves 19 extending therefrom, these dwarf grooves preferably being disposed equidistant around the seat. A central threaded passageway 20 extends through the valve stem and has a radial bore 21 at its bottom which connects at its ends with the two diametrically opposed longitudinal grooves 22 in the plug surface (only one being shown) which extend to the end of the plug and communicate with a lubricant chamber 24. Longitudinal grooves 23 are provided on the plug which terminate short of the smaller end of the plug, and at their upper ends connect with dwarf grooves 19 in full open and full closed positions of the plug. This groove system is disclosed and claimed in my co-pending application, Serial No. 230,105, filed September 15, 1938.

Within the threaded bore of the stem preferably is located a check valve assembly 27, comprising a cylindrical threaded bushing 28 having a bore 29 therein which is counterbored at 31 and 32 to provide seats for the valve balls 33 and 34 respectively. The end of the bushing may be deformed inwardly at 35 to prevent the check balls from falling out of their respective bores.

Preferably the upper edge of the bushing 28 is carefully machined to provide a tapered valve seat 36. The threaded bore 20 receives a lubricator assembly which comprises an externally threaded bushing 38 having a reduced end 39 providing a clearance 40 with the bore 20 and terminating in a tapered nose 41 which acts as a valve and is adapted to co-operate with the valve seat 36 on the check valve housing. The lubricator is adjustably locked in position by a jamb nut 43 threaded thereon at its outer end and having a tapered sealing surface 44 adapted to be received in a tapered sealing recess 45 on the valve stem. It will be apparent that when the jamb nut is turned inwardly it wedges into the tapered recess to provide a seal and locks the threads on the lubricator to prevent rotation of the lubricator. The lubricator has a threaded bore 51 which terminates in an extension 52, and radial bores 53 in the reduced end connected therewith provide communication between the interior of the threaded bore 51 and clearance 40 surrounding the reduced end of the lubricator, and a threaded lubricator screw 54 or other suitable lubricant compressor is connected to bore 51.

The operation of the apparatus now will be described. Assuming the parts to be in position as shown in Figure 2, the lubricator nose 41 is forced against the seat 36, thus preventing escape of lubricant or line fluid through the check valve fitting 28 into bore 20. Should any line fluid enter bore 20 the sealing surfaces 44 and 45 prevent its escape to the exterior. To lubricate the valve, the locknut 43 is turned to retract it from the tapered recess in the stem, thus releasing the lubricator 38 for turning and the lubricator is then turned to move it longitudinally a short distance and separate the valve 41 from the seat 36. The jamb nut 43 is again threaded downwardly so as to wedge the lubricator bushing in place and prevent it from turning. The lubricant screw 54 now is turned inwardly to force lubricant through the central threaded bore 52 and through the radial passageway 53 into the clearance space 40 and thence downwardly through bore 29 of the check valve fitting and through bore 21 into the lubricating system for the valve. When the lubricating operation is completed, the jamb nut 43 is retracted, the lubricator bushing 38 threaded down until the valve nose 41 engages the valve seat 36. The jamb nut then again is turned downwardly to wedge the lubricator in place.

In the modification shown in Figure 3, wherein like parts are correspondingly numbered, the lubricator bushing 56 has an enlarged extension 57 which has a threaded bore 58 therein providing a lubricant reservoir. This construction is desirable for hot services because the lubricant in the reservoir 58 is surrounded by the atmosphere, which helps to prevent the lubricant from becoming excessively heated before it is introduced into the valve. An oversized lubricant screw 59 also is employed in this modification to provide a more rapid feed of lubricant to the valve.

As shown, the lubricator 38 is provided as an auxiliary for the check valve fitting 28 so as to prevent escape of line fluid should the check valve fail to provide a complete seal. However, it will be understood that the check valve balls 33 and 34 may be omitted, or if desired, the bushing 28 may be omitted, in which case the bore 20 is reduced to provide a valve seat for the nose 41 of the lubricator.

It will also be understood that the lubricator may be applied to the valve stem shown in my copending application, Serial No. 35,848, filed August 12, 1935.

What I claim as my invention and desire to secure by Letters Patent is:

1. A valve comprising a casing having a passageway therethrough for flow of line fluid under pressure; a rotatable valve member for closing said passageway, said member having a lubricant receiving surface groove and a transverse passage communicating with said groove; an operating stem for said valve member extending from said casing, said stem having an axial bore communicating with said transverse passage and said bore being internally threaded at its outer end; means providing an annular valve seat within said bore outwardly of said transverse passage; a lubricator tube threaded in said bore, said tube having an internal reservoir chamber adapted to contain a supply of lubricant and an internally threaded axial bore leading to said chamber; a valve face on the bottom of said tube adapted to fit snugly on said valve seat; a passage in said tube between said chamber and the bore of said stem outwardly of said valve seat; and a lubricator compressor screw threaded in the bore of said tube and having an operating head projecting from said tube, the lower end of said screw compressing the lubricant in said chamber and feeding it under pressure through said tube passage into the bore of the stem upon rotation of said screw in a selected direction, and said tube being rotatable to unseat said valve face and permit flow of said lubricant under pressure to said transverse passage while lubricating said valve member and to reseat said valve face to prevent return flow of lubricant or leakage of said line fluid when said screw is removed from said tube.

2. In the valve defined in claim 1, that portion of said lubricator tube which contains said reservoir chamber being located externally of said valve stem so as to be cooled by the surrounding atmosphere.

3. Apparatus for supplying lubricant to a zone exposed to fluid at high pressure and for positively preventing escape of fluid from said zone comprising a housing enclosing said zone, a bore extending into said housing from the outer surface thereof and having a tapered seat at its inner end, a passageway leading from said bore to said zone, a lubricant container threaded for axial movement within said bore and having its inner end in the form of a tapered seating surface to cooperate with said tapered seat upon inward axial movement of said lubricant container to provide a positive seal between said passageway and said bore and to open communication between said bore and said passageway upon outward axial movement of said lubricant container, an aperture in said lubricant container, and means for forcing lubricant from said lubricant container into said bore and through said passageway to said zone while said bore is in open communication with said passageway.

4. In the apparatus for supplying lubricant defined in claim 3; adjustable means for locking said lubricant container against movement with respect to said housing.

5. Apparatus for supplying lubricant to a zone exposed to fluid at high pressure and for positively preventing escape of fluid from said zone comprising a housing enclosing said zone, a bore extending into said housing from the outer surface thereof and terminating at its inner end in a tapered seat, a passageway leading from said bore to said zone, a lubricant container threaded for axial movement within said bore, an aperture in said lubricant container, the inner end of said lubricant container being in the form of a tapered seating surface to cooperate with said tapered seat upon inward axial movement of said lubricant container to provide a positive seal between said passageway and said aperture and to open communication between said aperture and said passageway upon outward axial movement of said lubricant container and means for forcing lubricant from said lubricant container through said aperture and through said passageway to said zone while said aperture is in open communication with said passageway.

SVEN J. NORDSTROM.